United States Patent
Vu et al.

(10) Patent No.: US 11,012,463 B2
(45) Date of Patent: May 18, 2021

(54) PREDICTING CONDITION OF A HOST FOR CYBERSECURITY APPLICATIONS

(71) Applicant: INTERNATIONAL BUSINESS MACHINES CORPORATION, Armonk, NY (US)

(72) Inventors: Long Vu, White Plains, NY (US); Xuan-Hong Dang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 16/183,397

(22) Filed: Nov. 7, 2018

(65) Prior Publication Data
US 2020/0145448 A1    May 7, 2020

(51) Int. Cl.
*H04L 29/06*   (2006.01)
*H04L 12/24*   (2006.01)
*H04L 12/26*   (2006.01)

(52) U.S. Cl.
CPC ........ *H04L 63/1433* (2013.01); *H04L 41/142* (2013.01); *H04L 41/147* (2013.01);
(Continued)

(58) Field of Classification Search
CPC . H04L 63/1433; H04L 41/142; H04L 41/147; H04L 43/04; H04L 43/08; H04L 63/145
See application file for complete search history.

(56) References Cited

U.S. PATENT DOCUMENTS 9,225,772 B2 *  12/2015  Lui ..................... H04L 43/0817
9,227,264 B2    1/2016   Miller et al.
(Continued)

FOREIGN PATENT DOCUMENTS

JP    2013097615 A    5/2013

OTHER PUBLICATIONS

Xiao et al., Temporal multi-view inconsistency detection for network traffic analysis, Proceedings of the 24th International Conference on World Wide Web, pp. 455-465, ACM, 2015.
Krogh et al., Predicting transmembrane protein topology with a hidden Markov model: application to complete genomes, Journal of molecular biology 305.3, pp. 567-580, 2001.
(Continued)

*Primary Examiner* — J. Brant Murphy
*Assistant Examiner* — Stephen T Gundry
(74) *Attorney, Agent, or Firm* — Kurt Goudy; Otterstedt, Wallace & Kammer, LLP

(57) ABSTRACT

For a plurality of hosts, observe first time-varying characteristics including network throughput, central processing unit (CPU) usage, and/or memory usage; second time-varying characteristics including software configuration; and time-invariant characteristics including hardware configuration, at a plurality of timestamps. Construct a restricted HMM configured to predict actual host states, wherein the first time-varying characteristics include observed variables. The current observed variables depend on current values of the hidden variables and prior timestamp distribution of the observed variables. The former in turn depend on prior timestamp values of the hidden variables, the time-invariant characteristics of the hosts. and current timestamp values of the second time-varying characteristics. Estimate parameters of the restricted HMM; run the restricted HMM with the estimated parameters for each of the hosts; analyze the results to identify at least one of the hosts which has a potential cybersecurity issue; and take at least one remedial action.

25 Claims, 5 Drawing Sheets

(52) U.S. Cl.
CPC .............. *H04L 43/04* (2013.01); *H04L 43/08* (2013.01); *H04L 63/145* (2013.01)

(56) References Cited

U.S. PATENT DOCUMENTS

| | | | | |
|---|---|---|---|---|
| 9,483,334 | B2* | 11/2016 | Walsh | H04L 41/147 |
| 9,516,053 | B1* | 12/2016 | Muddu | H04L 63/1433 |
| 10,122,747 | B2* | 11/2018 | Mahaffey | G06F 11/3072 |
| 2013/0080641 | A1* | 3/2013 | Lui | H04L 43/045 709/226 |
| 2014/0222997 | A1* | 8/2014 | Mermoud | H04L 41/147 709/224 |
| 2015/0106511 | A1* | 4/2015 | Astigarraga | H04L 67/10 709/224 |
| 2015/0142384 | A1 | 5/2015 | Chao et al. | |
| 2015/0163121 | A1* | 6/2015 | Mahaffey | H04L 63/1425 707/687 |
| 2017/0063886 | A1* | 3/2017 | Muddu | G06K 9/2063 |
| 2017/0279698 | A1* | 9/2017 | Sartran | H04L 41/142 |
| 2017/0310691 | A1* | 10/2017 | Vasseur | H04L 63/1458 |
| 2017/0339178 | A1* | 11/2017 | Mahaffey | H04L 67/16 |
| 2018/0205666 | A1* | 7/2018 | Nash | H04L 67/10 |
| 2019/0036959 | A1* | 1/2019 | Ford | G06F 21/6245 |
| 2019/0268851 | A1* | 8/2019 | Herrin | H04W 52/0225 |
| 2019/0356699 | A1* | 11/2019 | Ford | H04L 63/205 |
| 2020/0019891 | A1* | 1/2020 | Poirel | G06N 20/00 |
| 2020/0028862 | A1* | 1/2020 | Lin | G06N 20/00 |
| 2020/0045049 | A1* | 2/2020 | Apostolopoulos | H04L 63/1425 |
| 2020/0076839 | A1* | 3/2020 | Luiggi | H04L 63/1433 |
| 2020/0076843 | A1* | 3/2020 | Luiggi | H04L 63/1425 |
| 2020/0099592 | A1* | 3/2020 | Mahindru | G06F 16/1734 |
| 2020/0128036 | A1* | 4/2020 | Sarzynski | H04L 63/1433 |
| 2020/0145447 | A1* | 5/2020 | Coffey | H04L 63/1425 |

OTHER PUBLICATIONS

Kupila, et al. Feasibility of genetic and immunological prediction of type I diabetes in a population-based birth cohort, Diabetologia 44, No. 3, pp. 290-297, 2001.

Siepel et al., Combining phylogenetic and hidden Markov models in biosequence analysis, Journal of Computational Biology, 11, No. 2-3, pp. 413-428, 2004.

Huang et al., Medical inpatient journey modeling and clustering: a Bayesian hidden Markov model based approach, In AMIA Annual Symposium Proceedings, vol. 2015, pp. 649-658.

Oke et al., The use of statistical methodology to determine the accuracy of grading within a diabetic retinopathy screening programme, Diabetic Medicine, 33 No. 7, 2016, pp. 896-903.

Compas et al., Latent variable analysis of coping, anxiety/depression, and somatic symptoms in adolescents with chronic pain, Journal of consulting and clinical psychology 74, No. 6, pp. 1132-1142, 2006.

Chib, Siddhartha, "Estimation and Comparison of Multiple Change-Point Models," Journal of Econometrics 86 (1998) 221-241.

Li, Cen, "A Bayesian Approach to Temporal Data Clustering using the Hidden Markov Model Methodology," Dissertation, Vanderbilt University, Dec. 2000, cover, pp. i-xvi, pp. 1-251.

Xiao, H. et al. (Aug. 2017). Learning Temporal State of Diabetes Patients via Combining Behavioral and Demographic Data. In Proceedings of the 23rd ACM SIGKDD International Conference on Knowledge Discovery and Data Mining (pp. 2081-2089). ACM.

Peter Mell and Timothy Grance, The NIST Definition of Cloud Computing, NIST Special Publication 800-145, Sep. 2011, cover, pp. i-iii, pp. 1-3.

Wikipedia, Hidden Markov model, Retrieved from "https://en.wikipedia.org/w/index.php?title=Hidden_Markov_model&oldid=856354109" Aug. 24, 2018 pp. 1-14.

* cited by examiner

PREDICTING CONDITION OF A HOST FOR CYBERSECURITY APPLICATIONS

TECHNICAL FIELD

The present invention relates to the electrical, electronic, and computer arts, and more specifically, to computer and network security and related technologies.

BACKGROUND

A computing device connected to a computer network is referred to as a network host (a network node that is assigned a network address); such a host may offer resources, services, and/or applications to users and/or to other nodes on the network. Computers interconnected with networks that use the Internet protocol suite may also be called IP hosts; computers participating in the Internet are called Internet hosts or Internet nodes. Hosts typically have one or more IP addresses assigned to their network interfaces. Network hosts that participate in applications that use the client-server model of computing, are classified as server or client systems; network hosts may also function as nodes in peer-to-peer applications.

Cybersecurity, computer security or information technology (IT) security refers to the protection of computer systems from, inter alia, illicit data access and/or disruption or misdirection of provided services. Cybersecurity has grown in importance with the increased reliance on computer systems, the Internet, ubiquitous wireless networks, and due to the growth of smartphones and other "smart" devices as well as the Internet of Things (IoT).

An attack or "exploit" may originate from one or more bad actors using one or more host machines. Current techniques may be have difficulty in identifying compromised hosts/actors and/or may be vulnerable to false alarms.

SUMMARY

Embodiments of the present disclosure provide techniques for predicting condition of a host for cybersecurity applications. According to an embodiment of the present invention, an exemplary method includes observing, for a plurality of hosts in a computer network, at a plurality of timestamps: first time-varying characteristics including at least one of network throughput, central processing unit (CPU) usage, and memory usage; second time-varying characteristics including at least software configuration; and time-invariant characteristics including at least hardware configuration. the second time varying characteristics vary on a time scale between the time-invariant characteristics and the first time-varying characteristics. A further step includes constructing a restricted hidden Markov model (HMM) wherein: the first time-varying characteristics include observed variables of the model; and the model is configured to predict actual host states for the plurality of hosts. the actual host states include hidden variables of the model. the observed variables, at a current one of the timestamps, depend on current values of the hidden variables and prior timestamp distribution of the observed variables. the current values of the hidden variables in turn depend on prior timestamp values of the hidden variables as well the time-invariant characteristics of the hosts and current timestamp values of the second time-varying characteristics of the hosts. Further steps include estimating parameters of the restricted hidden Markov model (HMM); running the restricted hidden Markov model (HMM) with the estimated parameters for each of the plurality of hosts to obtain results; analyzing the results to identify at least one of the hosts which has a potential cybersecurity issue; and taking at least one remedial action with respect to the identified one of the hosts. Advantageously, embodiments can more accurately identify compromised hosts and/or minimize or eliminate false alarms.

In another aspect, an apparatus includes a memory; a network interface; and at least one processor, coupled to the memory and the network interface. The at least one processor is operative to observe, via the network interface, for a plurality of hosts in a computer network, at a plurality of timestamps: first time-varying characteristics including at least one of network throughput, central processing unit (CPU) usage, and memory usage; second time-varying characteristics including at least software configuration; and time-invariant characteristics including at least hardware configuration. the second time varying characteristics vary on a time scale between the time-invariant characteristics and the first time-varying characteristics. The at least one processor is further operative to construct a restricted hidden Markov model (HMM) wherein: the first time-varying characteristics include observed variables of the model; and the model is configured to predict actual host states for the plurality of hosts. the actual host states include hidden variables of the model. the observed variables, at a current one of the timestamps, depend on current values of the hidden variables and prior timestamp distribution of the observed variables. the current values of the hidden variables in turn depend on prior timestamp values of the hidden variables as well the time-invariant characteristics of the hosts and current timestamp values of the second time-varying characteristics of the hosts. The at least one processor is further operative to estimate parameters of the restricted hidden Markov model (HMM); run the restricted hidden Markov model (HMM) with the estimated parameters for each of the plurality of hosts to obtain results; analyze the results to identify at least one of the hosts which has a potential cybersecurity issue; and facilitate taking at least one remedial action with respect to the identified one of the hosts. Advantageously, embodiments can more accurately identify compromised hosts and/or minimize or eliminate false alarms.

In still another, another exemplary method includes observing, for a plurality of online actors acting on a computer network, at a plurality of timestamps: first time-varying characteristics including at least one of web browsing activity and web search activity; second time-varying characteristics including at least one of income, social connections, interests, and seasonal access patterns; and time-invariant characteristics including at least one of residence and demographic information. the second time varying characteristics vary on a time scale between the time-invariant characteristics and the first time-varying characteristics. A further step includes constructing a restricted hidden Markov model (HMM) wherein: the first time-varying characteristics include observed variables of the model; and the model is configured to predict actual actor states for the plurality of actors. the actual actor states include hidden variables of the model. the observed variables, at a current one of the timestamps, depend on current values of the hidden variables and prior timestamp distribution of the observed variables. the current values of the hidden variables in turn depend on prior timestamp values of the hidden variables as well the time-invariant characteristics of the actors and current timestamp values of the second time-varying characteristics of the actors. Further steps include estimating parameters of the restricted hidden Markov model (HMM); running the restricted hidden Markov model (HMM) with the estimated parameters for each of the plurality of actors to obtain results; analyzing the results to identify at least one of the actors which has a potential cybersecurity issue; and taking at least one remedial action with respect to the identified one of the actors. Advantageously, embodiments can more accurately identify compromised actors and/or minimize or eliminate false alarms.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

Accurate prediction of hidden states for network hosts to facilitate prevention of cybersecurity issues;

Ability to base predictions on multiple data sources;

Ability to proactively remediate problematic hosts;

Ability to work with temporal time series data.

These and other features and advantages of the present invention will become apparent from the following detailed description of illustrative embodiments thereof, which is to be read in connection with the accompanying drawings.

DETAILED DESCRIPTION

Figure 1:
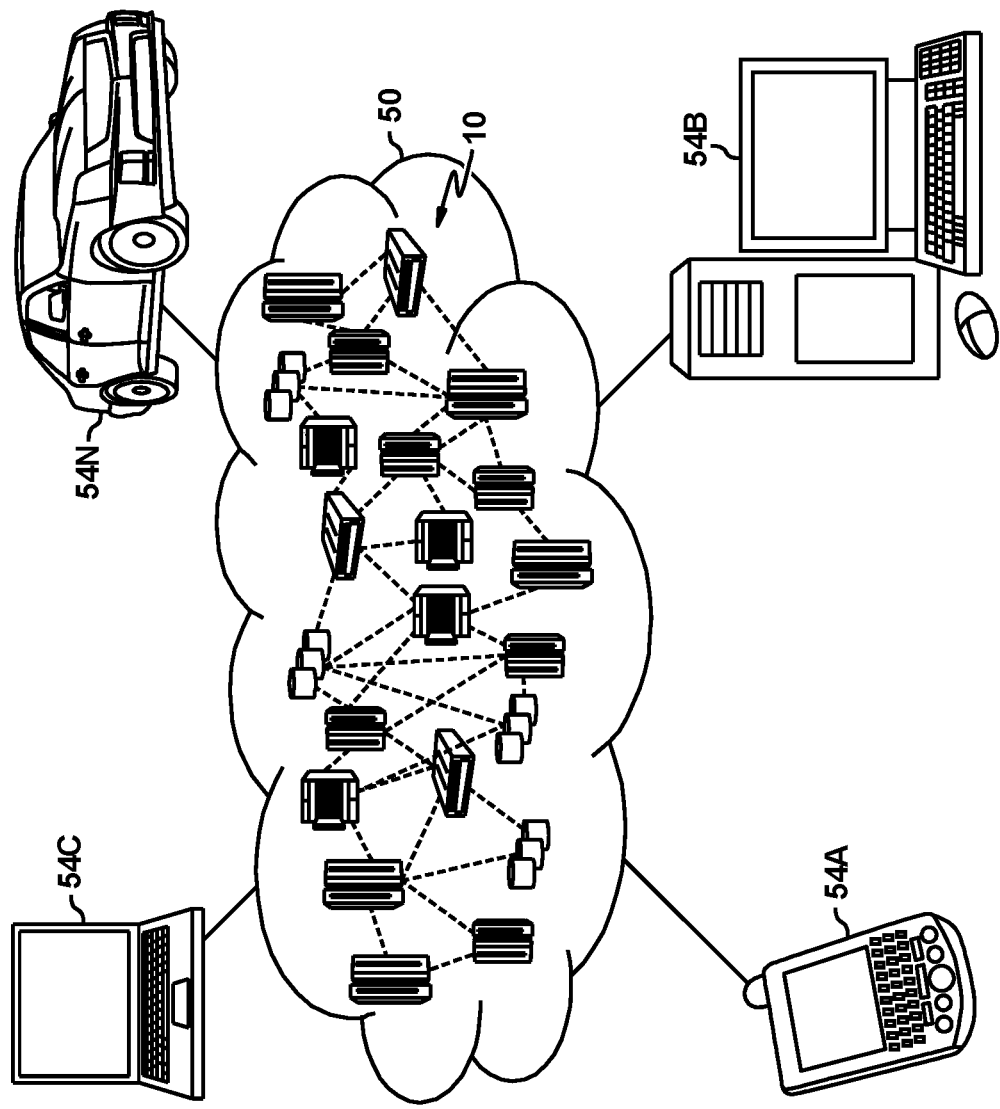
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
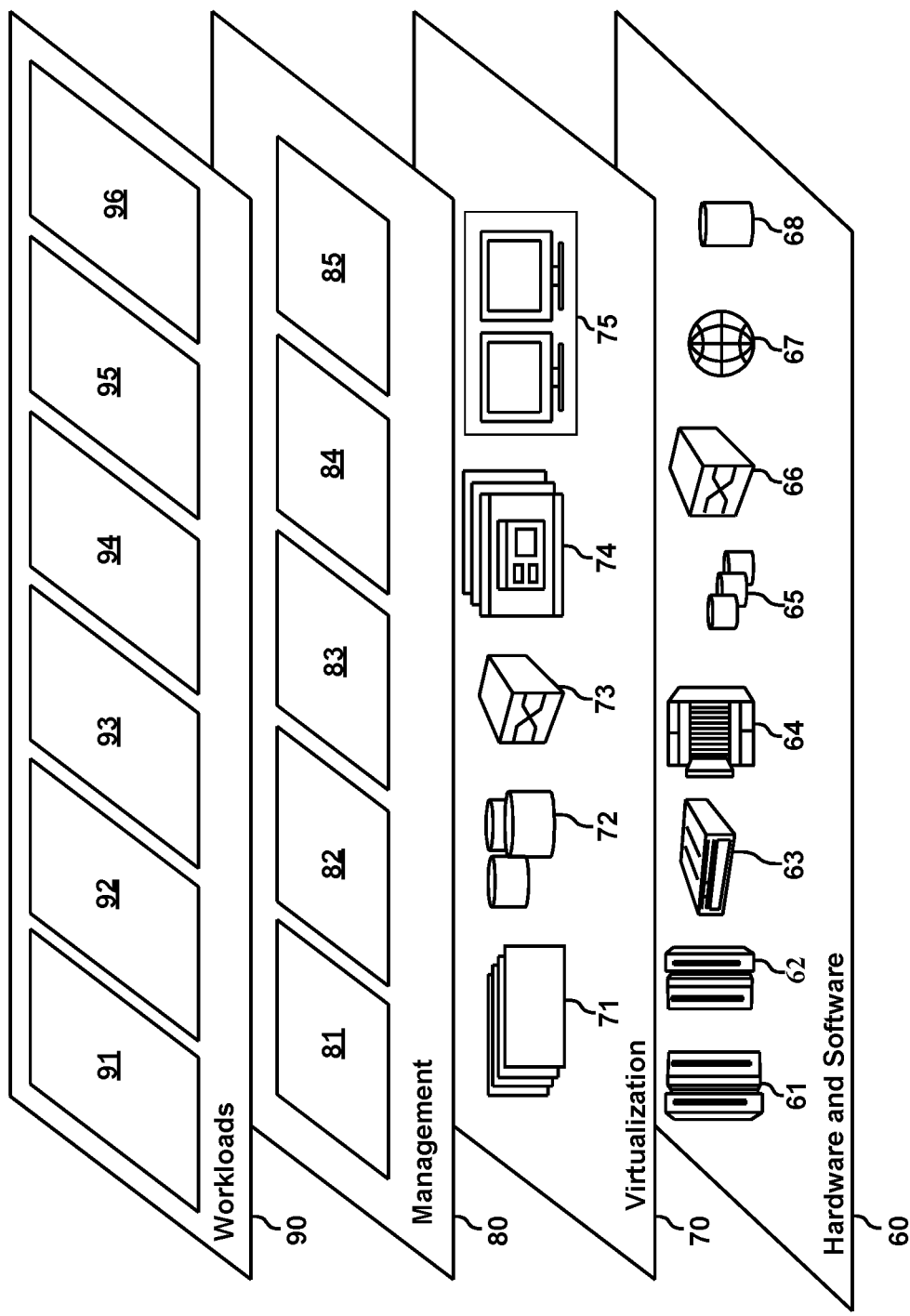
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a service 96 for predicting condition of a host for cybersecurity applications. That is to say, in some embodiments, aspects of the invention or portions thereof can reside in the workload layer in the cloud. For example, some embodiments monitor nodes in the cloud. Indeed, one or more embodiments can be employed to monitor one or more hosts in a cloud environment.

As noted, cybersecurity has grown in importance with the increased reliance on computer systems, the Internet, ubiquitous wireless networks, and due to the growth of smartphones and other "smart" devices as well as the Internet of Things (IoT). An attack or "exploit" may originate from one or more bad actors using one or more host machines.

One or more embodiments advantageously detect discrete, temporal behaviors of interest (e.g., malicious and/or abnormal behavior with respect to computing resources). Real-world settings include entities (e.g., computer hosts, online users) with time-varying characteristics. Some characteristics change slowly over time (e.g., host hardware configuration); some characteristics change on a medium-term basis (e.g., software configuration); while other characteristics change faster over time (e.g., network throughput, central processing unit (CPU) usage, memory usage, web browsing activity, and web search activity). Each entity has a sequence of temporal states that can be inferred from these slow, medium, and fast time-varying characteristics. These temporal state sequences can be used in predicting abnormal (e.g. malicious) online behaviors.

One or more embodiments advantageously build an efficient restricted Hidden Markov Model that combines slow, medium, and fast time-varying characteristics to extract and learn temporal states of entities and detect abnormal online behaviors, to facilitate remediation thereof. Indeed, one or more embodiments provide a mechanism that: (1) combines different types of time-varying characteristics to construct a restricted Hidden Markov Model of temporal states, (2) estimates model parameters (e.g., by using the Markov Chain Monte Carlo method), and (3) uses extracted temporal state sequences to detect abnormal behaviors and profile entities, to facilitate remediation. In one or more embodiments, "fast" time-varying characteristics change on the scale of seconds or minutes; "medium" time-varying characteristics change on the scale of weeks or months; and "slow" time-varying characteristics do not change at all with time, or change slowly on the scale of years.

Indeed, one or more embodiments advantageously facilitate anomaly detection in cybersecurity applications in communication networks. A computer machine (or host) has low time-varying characteristics such as hardware configuration; medium time-varying characteristics such as software configuration; and high time-varying characteristics such as its network throughput, CPU usage, and memory availability. The host's temporal states (e.g., streaming flash content, uploading data, posting photos) can be inferred from the host's time-varying characteristics. The extracted states form sequences that can be used to cluster hosts and detect abnormal hosts.

In another aspect, temporal states of a computer user can be inferred from the user's time-varying characteristics; these temporal states form sequences that can be used to detect abnormal web accesses or other abnormal behavior of a particular computer user (for example, bad actor pretending to be that person). In this aspect, static or even unchanged characteristics of the user could include the user's age cohort, user's marital status, user's home postal code. Medium time-varying characteristics can be user's income, user's social contacts, user's hobbies, user's seasonal shopping patterns such as school starts, and seasonal holidays. High time-varying characteristics could include current web browsing history, web search sessions, and the like. Anomalous behavior might indicate that a bad actor has assumed a legitimate user's identity and/or gained access to the legitimate user's resources.

Figure 3:
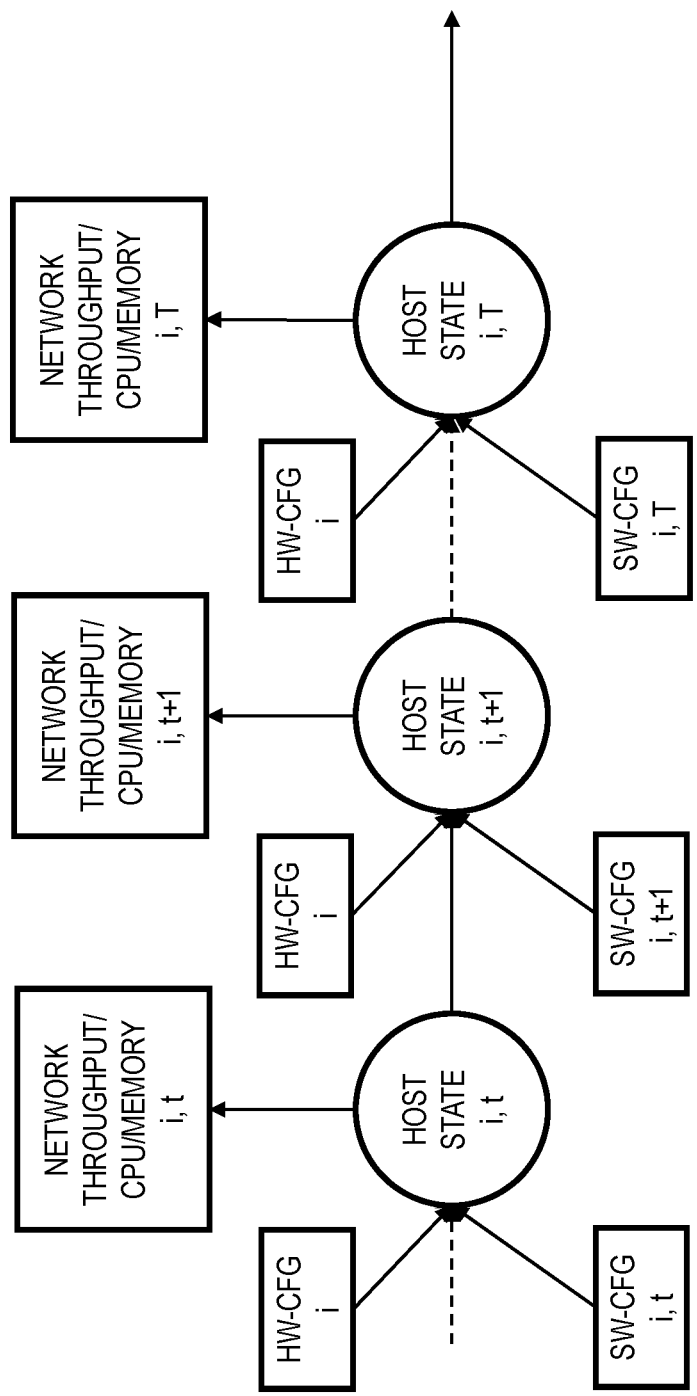
FIG. 3 depicts restricted Hidden Markov Modeling to identify cybersecurity issues, in accordance with an aspect of the invention.

Reference should now be had to FIG. 3, which depicts analysis of a host computer for cybersecurity applications using a restricted Hidden Markov Model (HMM), in accordance with an aspect of the invention. One or more embodiments infer the hidden temporal state, a, of a host computer at a time t (e.g., normal or malicious) based on observed dynamic characteristics X such as network throughput, CPU usage, and/or memory usage (which exhibit high variation with time); hardware configuration (HW-CFG)(Z) (which is fixed or has little variation with time); and software configuration (SW-CFG)(Y) (which has medium variation with time). Medium term characteristics change more slowly than high time-varying characteristics but change faster than static or low time-varying characteristics. The software configuration has a subscript (i, t) in the software configuration terms to denote that this category also changes over time, although it is slower than high time-varying characteristics.

With continued reference to FIG. 3, in one or more embodiments, a restricted Hidden Markov Model (HMM) is constructed. Including medium multivariate variable $Y_{it}$, associated with the software configuration, model the following transition pattern (transition state probability) from state k to k' at each time t and with respect to a machine i as follows:

$$P_{kk'} = P(\alpha_{it+1} = S_k | \alpha_{it} = S_{k'}, Z_i, Y_{it}) = G(Z_i, Y_{it}, \alpha_{it}, \alpha_{it+1})$$

$Z_i$ is the hardware configuration of host i (HW-CFG$_i$).

The emission probability of observing $X_{it}$ at time t assuming the hidden state is $\alpha_{it}$ is:

$$P_{\alpha_{it}}(X_{it}) = P(X_{it} | \alpha_{it}, c_{\alpha_{it}}, \mu_{\alpha_{it}}, \sigma_{\alpha_{it}})$$

The introduced medium variable has a changing rate higher than that of the static variable $Z_i$ but much less than that of the dynamic behavior variable $X_{it}$.

$G(Z_i, Y_{it}, \alpha_{it}, \alpha_{it+1})$ is the link function and a general logistic function can be used for it:

$$G(Z_i, Y_{it}, \alpha_{it}, \alpha_{it+1}) = \lambda^T Z_i + \gamma^T Y_{it} + \nu^T(\alpha_{it}, \alpha_{it+1})$$

In the above, $\lambda$, $\gamma$, $\nu$ are coefficient vectors capturing the contribution of static variable, medium variable and the change rates for the previous and current underlying hidden states respectively. They all are model parameters and, in one or more embodiments, will be learned under the framework of Bayesian Inference.

The full conditional distribution for the hidden (host) state $\alpha_{it}$ is given by:

$$P(\alpha_{it} | X_i, Z_i, Y_i, \pi, \beta) = \Pi_k \tilde{\pi}_{ik,t}^{I(\alpha_{it} = k)}$$

The estimation of $\tilde{\pi}_{ik,t}$ takes either of the following two forms (respectively for the timestamp t=1 and t>1):

$$\tilde{\pi}_{ik,t} = \frac{\pi_k P(X_{it} | \alpha_{it} = k, \beta)}{\sum_{k'} \pi_{k'} P(X_{it} | \alpha_{it} = k', \beta)} \text{ for } t = 1$$

$$\tilde{\pi}_{ik,t} = \frac{\pi_k P(X_{it} | \alpha_{it} = k, \beta) P(\alpha_{it} = k | \alpha_{it-1}, Z_i, Y_{it})}{\sum_{k'} \pi_{k'} P(X_{it} | \alpha_{it} = k', \beta) P(\alpha_{it} = k' | \alpha_{it-1}, Z_i, Y_{it})}$$

for $t > 1$

The estimation of the developed model will be learned, for example, via the Markov chain Monte Carlo (MCMC), Variational Inference (VI), or the Laplace Approximation.

In cybersecurity applications, consider c, μ, and σ. For Exponential distribution, c specifies what the distribution curve looks like. This parameter c can be estimated from cyber data. Similarly, μ and σ are used to represent the Gaussian distribution shape. They are also estimated from real cyber data. Many existing tools can be used to estimate these parameters from real cyber data, given the teachings herein, such as MATLAB® software (registered mark of The MathWorks, Inc. Natick, Mass., USA), the R language and environment for statistical computing and graphics, and the PyMC3 Python package for Bayesian statistical modeling and Probabilistic Machine Learning focusing on advanced Markov chain Monte Carlo (MCMC) and variational inference (VI) algorithms.

$P_{kk'}$ is a transition pattern; different hosts with different time-invariant or slowly-varying parameters (e.g., hardware configuration HW-CFG$_i$) will have different transition patterns. S is the finite set of possible nodes states (or hidden states) such as accessing a website, downloading a file, upgrading a software library, under high workload, under light workload, etc. G is a link function that models transition probability between two hidden states.

As will be appreciated by the skilled artisan, a Hidden Markov Model (HMM) estimates hidden or latent variables based on observed variables; one or more embodiments employ a restricted HMM wherein there is dependency not only on the latent or hidden state at the previous and current timestamp, but also on data that is time-invariant or nearly so (hardware configuration) and also dependency on data that is time-varying on a medium-term scale (software configuration). In one or more embodiments, X depends on Y and Z.

For an HMM to be used for predictive purposes, its parameters should be estimated. One or more embodiments employ a Markov Chain Monte Carlo method for parameter estimation:

$$P(\alpha_{it} \mid X_i, Z_i, Y_i, \pi, \beta) = \prod_k \tilde{\pi}_{ik,t}^{I(\alpha_{it}=k)}$$

The $\pi$ is prior probability of hidden states, $\beta$ is the parameter of Gamma distribution used in the model, I is an identity function that has the value of 1 if $\alpha_{it}$ is equal to k; otherwise I has the value of 0. The k is the index (from 1 to K) for all possible K hidden states.

Once the restricted HMM parameters have been estimated, the restricted HMM, given the observed NETWORK THROUGHPUT/CPU/MEMORY$_{i,t+1}$; the time-invariant HW-CFG$_i$; and the medium-time-dependent SW-CFG$_i$; can be used to infer the underlying state of the host i at time t.

This can be done for a number of different hosts and abnormalities can be discovered by comparing the inferred host state at different times and compared to other hosts. Remediation can then be initiated against hosts identified as potentially suspicious.

One or more embodiments accordingly provide a method for building restricted Hidden Markov Models to learn the temporal states of entities such as hosts or network users. In one or more embodiments, each entity has low time-varying (e.g., hardware configuration) and high time-varying characteristics (e.g., network throughput, CPU usage, memory usage), as well as characteristics that vary on an intermediate time scale (e.g. software configuration), and there exist relationships between these types of characteristics. For cybersecurity, static or low time varying characteristics include hardware configuration (how much memory the node has, what is the CPU capability (how fast it is), how many cores or processors the node has). The medium time varying characteristics include version the software libraries, the network configuration on the node (each node may connect to a certain switch/hub/router and this may not change every day), seasonal workload of the node (some node(s) has/have higher load(s) during weekday vs. weekend).

In one or more embodiments, each entity has a set of temporal states associated with these time-varying (high and intermediate) characteristics. For each entity (e.g., host, user), these temporal states form a sequence in which each temporal state is associated with a timestamp. A restricted Hidden Markov Model is constructed for each entity, with nodes as temporal states, and edges existing between temporal states, and between time-varying characteristics and temporal states. In one or more embodiments, compute three feature vectors at a given timestamp, one vector for low time-varying characteristics, one vector for high time-varying characteristics, and one vector for medium time-varying characteristics. The parameters of the temporal states are learned from the feature vectors, and the parameters of a generative model are learned within each state and transition probability function using slow, medium, and fast time-varying characteristics.

The parameters of the probabilistic model can be estimated, for example, by using the Markov chain Monte Carlo (MCMC), Variational Inference (VI), the Laplace Approximation, or the like.

In one or more embodiments, the generative model for the high time-varying characteristics follows Gaussian distribution and Exponential distribution. Furthermore, in one or more embodiments, medium characteristics, similar to low time-varying characteristics, are the observations from real data. Accordingly, one or more embodiments do not assume any distribution for medium characteristics. One or more embodiments only assume distributions for X (or high time-varying characteristics) since it is desired to estimate or predict X. Other embodiments could use other approaches.

In one or more embodiments, the temporal traces of the entities (e.g., hosts, users) are used to estimate the parameters of the model. Given the model and new traces, sequences of temporal states of entities are computed. The temporal state sequences are converted into feature vectors and used for entity profiling and detection of abnormal (e.g., malicious or compromised) entities.

In at least some instances, the feature vector of an entity can be computed from different data sources that contain the time-varying characteristics of the entity.

In one or more embodiments, the model is built when its parameters are resolved, that is, when the formulated problem is solved.

Advantageously, one or more embodiments permit inferring sequences of temporal and hidden states for entities (e.g. hosts, network users); one or more embodiments employ time-varying characteristics of entities to infer temporal states, then combine these states to form a most likely sequence or trajectory. Furthermore, one or more embodiments permit multiple-source anomaly detection, wherein characteristics of entities can be extracted from multiple data sources. One or more embodiments can be used in applications having entities with multiple types of characteristics wherein these characteristics can be combined to infer hidden and temporal states of entities, such as hosts and network users.

One or more embodiments are also useful in preventing "false alarms." For example, suppose a host such as a server experiences a sharp increase in traffic. By comparing the host to other hosts serving the same geographical area, it may be found that this is not abnormal. For example, suppose geographic region "A" celebrates holiday "Z" but geographic regions "B" and "C" do not celebrate holiday "Z." Servers serving geographic region "A" may be expected to have a sharp increase in traffic during holiday "Z"; if they are compared to each other, there should not be a false alarm, but if they are compared to servers in regions "B" and/or "C" a false alarm might be possible.

One or more embodiments thus solve a problem unique to computers (identifying compromised hosts or malevolent on-line actors) and/or improve the functioning of a computer for actual detection of infected or compromised hosts.

Figure 4:
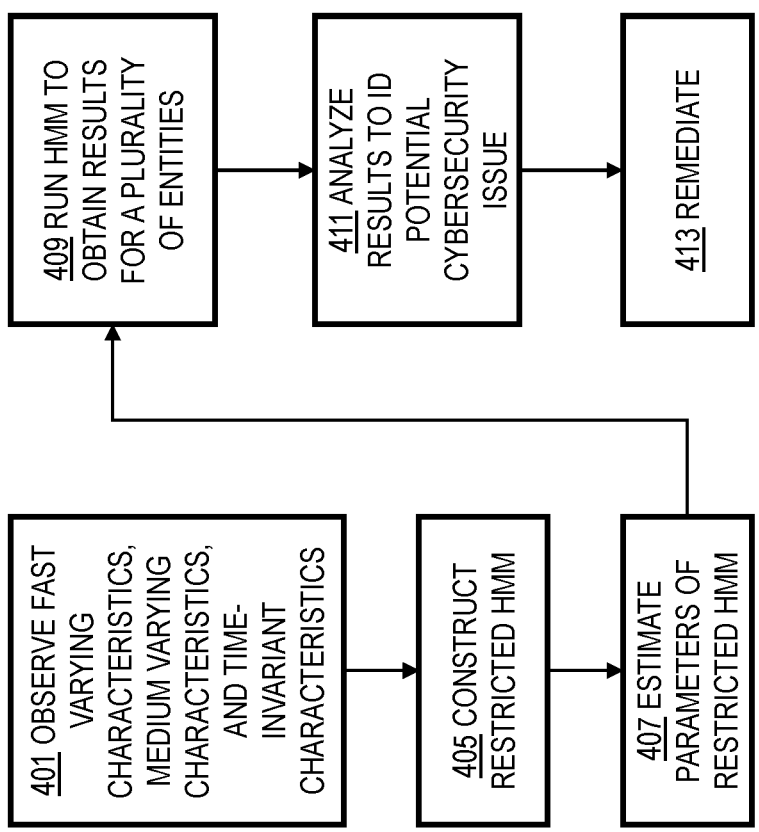
FIG. 4 depicts a flow chart of an exemplary method of identifying and remediating cybersecurity issues, in accordance with an aspect of the invention.

In one aspect, referring to FIG. 4, an exemplary method includes observing, for a plurality of hosts in a computer network (e.g., cloud computing nodes 10), at a plurality of timestamps (e.g., t, t+1 . . . T), first time-varying characteristics, second time-varying characteristics, and time-invariant characteristics (i.e., time-invariant characteristics essentially do not change over time; see discussion below), as per step 401. The first time-varying characteristics include at least one of network throughput, central processing unit (CPU) usage, and memory usage. The second time-varying characteristics include at least software configuration. The time-invariant characteristics include at least hardware configuration. The second time varying characteristics vary on a time scale between the time-invariant characteristics and the first time-varying characteristics. In one or more embodiments, first time-varying characteristics change on the scale of seconds or minutes; second time-varying characteristics change on the scale of weeks or months; and time-invariant characteristics do not change at all with time, or change slowly on the scale of years. Time-invariant characteristics that do not change at all with time are referred to herein as "completely time-invariant characteristics."

In one or more embodiments, second time-varying characteristics and time-invariant characteristics are observations from real data, and no distribution is assumed for the second time-varying characteristics. One or more embodiments only assume distributions for X (first time-varying characteristics) since it is appropriate to estimate or predict X.

A further step 405 includes constructing a restricted hidden Markov model (HMM) wherein the first time-varying characteristics include observed variables X of the model; and the model is configured to predict actual host states for the plurality of hosts. The actual host states (HOST STATE$_{i,t}$) are the hidden variables of the model. Referring to FIG. 3, the observed variable (X or NETWORK THROUGHPUT/CPU/MEMORY), at the current timestamp, depends on the current hidden state and the observed variable's prior distribution. The current hidden state depends on the previous hidden state, the invariant characteristics' observation, and the medium-term characteristics' observation at the current timestamp.

Still further steps include 407, estimating parameters of the restricted hidden Markov model (HMM); 409, running the restricted hidden Markov model (HMM) with the estimated parameters for each of the plurality of hosts to obtain results (i.e., hidden host state); 411, analyzing the results to identify at least one of the hosts which has a potential cybersecurity issue; and 413, taking at least one remedial action with respect to the identified one of the hosts.

In one or more embodiments, estimating the parameters of the restricted hidden Markov model (HMM) includes computing three feature vectors, one vector for the time-invariant characteristics λ, one vector for the first time-varying characteristics γ, and one vector for the second time-varying characteristics ν. Estimating the parameters of the restricted hidden Markov model (HMM) further includes learning sequences of temporal states $\alpha_i$, and learning parameters of a generative model within each state (e.g., hyperparameters of prior distributions) and transition probability function using the time-invariant characteristics, the first time-varying characteristics, the second time-varying characteristics, and the observable data.

As noted, estimating the parameters can include, for example, employing a Markov chain Monte Carlo technique; employing Variational Inference (VI); employing Laplace Approximation; or the like.

Non-limiting examples of remedial actions include blocking network traffic from the identified one of the plurality of hosts (for example, using a firewall). In some instances, this can be done in response to first monitoring network traffic from the identified one of the plurality of hosts, and then blocking the traffic when an anomaly is verified.

In another aspect, the at least one remedial action includes scanning the identified one of the plurality of hosts for malware and removing or quarantining discovered malware thereon; this aspect is generally feasible if the identified host is under the control of the entity that is predicting the host condition, or at least has some relationship with such entity.

The identified host may be offering information resources, services such as web services, and/or applications to users or other nodes on the network. A network host is a network node that is assigned a network address.

As noted, the extracted states form sequences that can be used to cluster hosts and detect abnormal hosts. Thus, in one or more embodiments, analyzing of the results to identify at least one of the hosts which has a potential cybersecurity issue includes clustering the hosts into a plurality of clusters (e.g., using k-means clustering or the like) and comparing the results for each of the hosts to other hosts in a same one of the clusters. This helps to avoid false alarms as discussed above.

In another aspect, which can also be illustrated at a high level by FIG. 4, another exemplary method includes step 401, observing, for a plurality of online actors acting on a computer network (e.g., Internet shoppers using nodes 10), at a plurality of timestamps, first time-varying characteristics including at least one of web browsing activity and web search activity; second time-varying characteristics including at least one of income, social connections, interests, and seasonal access patterns; and time-invariant characteristics including at least one of residence and demographic information. The second time varying characteristics vary on a time scale between the time-invariant characteristics and the first time-varying characteristics. A further step 405 includes constructing a restricted hidden Markov model (HMM) wherein the first time-varying characteristics include observed variables of the model; and the model is configured to predict actual actor states for the plurality of actors. The actual actor states are the hidden variables of the model. The observed variable (X or NETWORK THROUGHPUT/CPU/MEMORY), at the current timestamp, depends on the current hidden state and the observed variable's prior distribution. The current hidden state depends on the previous hidden state, the invariant characteristics' observation, and the medium-term characteristics' observation at the current timestamp.

Further steps include 407, estimating parameters of the restricted hidden Markov model (HMM); 409, running the restricted hidden Markov model (HMM) with the estimated parameters for each of the plurality of actors to obtain results; 411, analyzing the results to identify at least one of the actors which has a potential cybersecurity issue; and 413, taking at least one remedial action with respect to the identified one of the actors. For example, contact the putative actor and query with one or more security questions to determine that the putative actor is a genuine actor.

One or more embodiments are directed to an apparatus, discussed immediately below with regard to FIG. 5, including a memory 28; a network interface 20; and at least one processor 16, coupled to the memory and the network interface, and operative to carry pout or otherwise facilitate any one, some, or all of the method steps described herein. For example, observations can be made and/or remedial actions can be initiated, via the network interface.

One or more embodiments of the invention, or elements thereof, can be implemented in the form of an apparatus including a memory and at least one processor that is coupled to the memory and operative to perform exemplary method steps. FIG. 5 depicts a computer system that may be useful in implementing one or more aspects and/or elements of the invention, also representative of a cloud computing node according to an embodiment of the present invention. Referring now to FIG. 5, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 5:
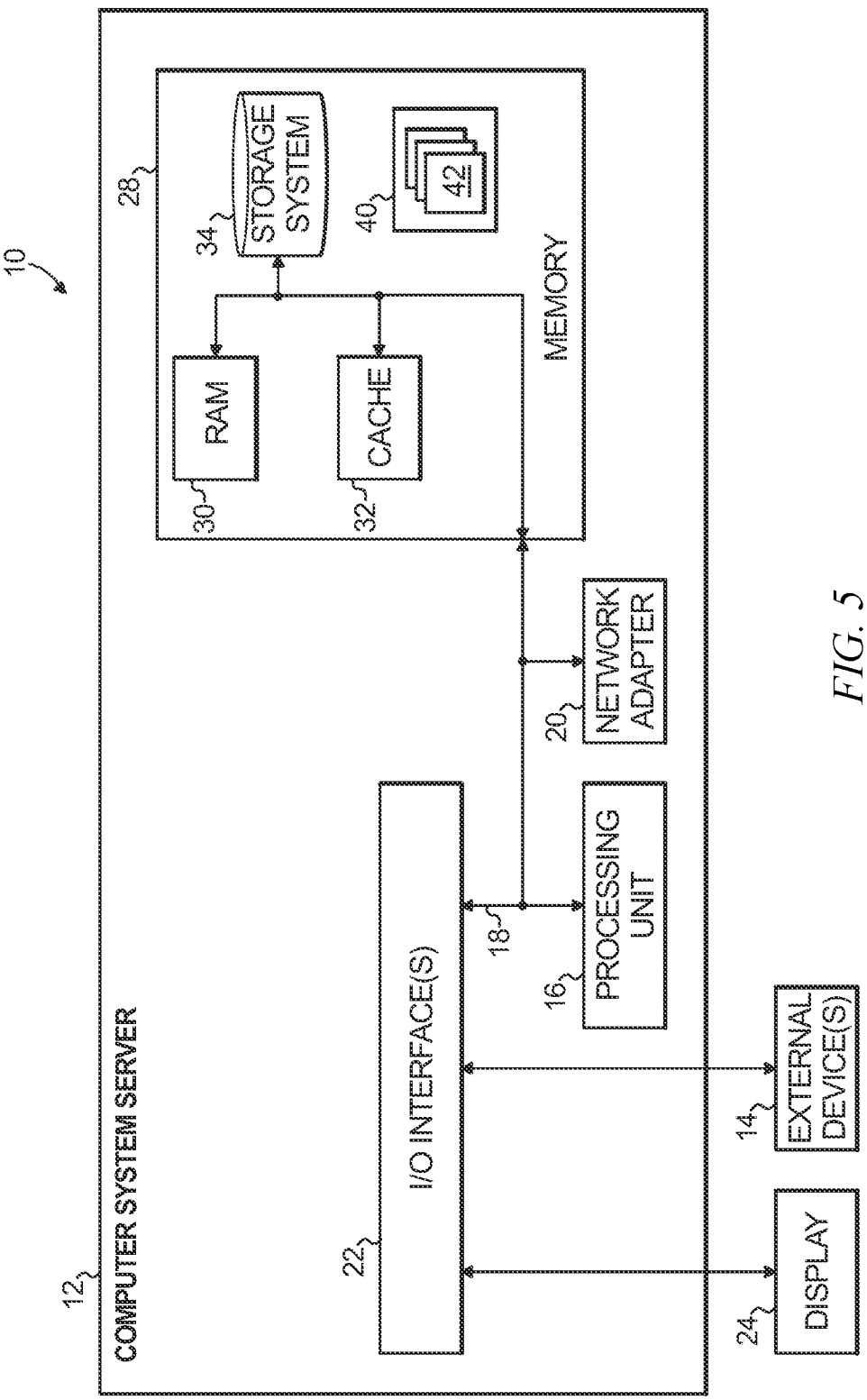
FIG. 5 depicts a computer system that may be useful in implementing one or more aspects and/or elements of the invention, also representative of a cloud computing node according to an embodiment of the present invention

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 5, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 5) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., service 96 which identifies potentially malevolent hosts and/or actors as described herein.

It should be noted that any of the methods described herein can include an additional step of providing a system comprising distinct software modules embodied on a computer readable storage medium; the modules can be, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    observing, for a plurality of hosts in a computer network, at a plurality of timestamps:
        first time-varying characteristics comprising at least one of network throughput, central processing unit (CPU) usage, and memory usage;
        second time-varying characteristics comprising at least software configuration; and
        time-invariant characteristics comprising at least hardware configuration;
        wherein said second time varying characteristics vary on a time scale between said time-invariant characteristics and said first time-varying characteristics;
    constructing a restricted hidden Markov model (HMM) wherein:
        said first time-varying characteristics comprise observed variables of said model;
        said model is configured to predict actual host states for said plurality of hosts, said actual host states comprising hidden variables of said model, wherein said observed variables, at a current one of said timestamps, depend on current values of said hidden variables and prior timestamp distribution of said observed variables, said current values of said hidden variables in turn depending on prior timestamp values of said hidden variables as well said time-invariant characteristics of said hosts and current timestamp values of said second time-varying characteristics of said hosts;
    estimating parameters of said restricted hidden Markov model (HMM);
    running said restricted hidden Markov model (HMI) with said estimated parameters for each of said plurality of hosts to obtain results;
    analyzing said results to identify at least one of said hosts which has a potential cybersecurity issue; and
    taking at least one remedial action with respect to said identified one of said hosts.

2. The method of claim 1, wherein estimating said parameters of said restricted hidden Markov model (HMM) comprises:
    computing three feature vectors at a given one of said timestamps, one vector for said time-invariant characteristics, one vector for said first time-varying characteristics, and one vector for said second time-varying characteristics;
    learning sequences of temporal states, and
    learning parameters of a generative model within each state and transition probability function using said time-invariant characteristics, said first time-varying characteristics, and said second time-varying characteristics.

3. The method of claim 2, wherein estimating said parameters comprises employing a Markov chain Monte Carlo technique.

4. The method of claim 2, wherein estimating said parameters comprises employing Variational Inference (VI).

5. The method of claim 2, wherein estimating said parameters comprises employing Laplace Approximation.

6. The method of claim 1, wherein said at least one remedial action comprises blocking network traffic from said identified one of said plurality of hosts.

7. The method of claim 1, wherein said at least one remedial action comprises monitoring network traffic from said identified one of said plurality of hosts.

8. The method of claim 7, wherein said at least one remedial action further comprises blocking network traffic from said identified one of said plurality of hosts, responsive to said monitoring.

9. The method of claim 1, wherein said at least one remedial action comprises scanning said identified one of said plurality of hosts for malware and at least one of removing and quarantining discovered malware thereon.

10. The method of claim 1, wherein said identified one of said plurality of hosts provides a web service.

11. The method of claim 1, wherein said analyzing of said results to identify at least one of said hosts which has a potential cybersecurity issue comprises clustering said hosts into a plurality of clusters and comparing said results for each of said hosts to other hosts in a same one of said plurality of clusters.

12. A non-transitory computer readable medium comprising computer executable instructions which when executed by a computer cause the computer to perform a method of:
    observing, for a plurality of hosts in a computer network, at a plurality of timestamps:
        first time-varying characteristics comprising at least one of network throughput, central processing unit (CPU) usage, and memory usage;
        second time-varying characteristics comprising at least software configuration; and
        time-invariant characteristics comprising at least hardware configuration;
        wherein said second time varying characteristics vary on a time scale between said time-invariant characteristics and said first time-varying characteristics;
    constructing a restricted hidden Markov model (HMM) wherein:
        said first time-varying characteristics comprise observed variables of said model;
        said model is configured to predict actual host states for said plurality of hosts, said actual host states comprising hidden variables of said model, wherein said observed variables, at a current one of said timestamps, depend on current values of said hidden variables and prior timestamp distribution of said observed variables, said current values of said hidden variables in turn depending on prior timestamp values of said hidden variables as well said time-invariant characteristics of said hosts and current timestamp values of said second time-varying characteristics of said hosts;
    estimating parameters of said restricted hidden Markov model (HMM);
    running said restricted hidden Markov model (HMM) with said estimated parameters for each of said plurality of hosts to obtain results;
    analyzing said results to identify at least one of said hosts which has a potential cybersecurity issue; and
    taking at least one remedial action with respect to said identified one of said hosts.

13. The non-transitory computer readable medium of claim 12, wherein, in said method, estimating said parameters of said restricted hidden Markov model (HMM) comprises:
    computing three feature vectors at a given one of said timestamps, one vector for said time-invariant characteristics, one vector for said first time-varying characteristics, and one vector for said second time-varying characteristics;
    learning sequences of temporal states, and
    learning parameters of a generative model within each state and transition probability function using said time-invariant characteristics, said first time-varying characteristics, and said second time-varying characteristics.

14. An apparatus comprising:
    a memory;
    a network interface; and
    at least one processor, coupled to said memory and said network interface, and operative to:
        observe, via said network interface, for a plurality of hosts in a computer network, at a plurality of timestamps:
            first time-varying characteristics comprising at least one of network throughput, central processing unit (CPU) usage, and memory usage;
            second time-varying characteristics comprising at least software configuration; and
            time-invariant characteristics comprising at least hardware configuration;
            wherein said second time varying characteristics vary on a time scale between said time-invariant characteristics and said first time-varying characteristics;
        construct a restricted hidden Markov model (HMM) wherein:
            said first time-varying characteristics comprise observed variables of said model;
            said model is configured to predict actual host states for said plurality of hosts, said actual host states comprising hidden variables of said model, wherein said observed variables, at a current one of said timestamps, depend on current values of said hidden variables and prior timestamp distribution of said observed variables, said current values of said hidden variables in turn depending on prior timestamp values of said hidden variables as well said time-invariant characteristics of said hosts and current timestamp values of said second time-varying characteristics of said hosts;
        estimate parameters of said restricted hidden Markov model (HMM);
        run said restricted hidden Markov model (HMM) with said estimated parameters for each of said plurality of hosts to obtain results;
        analyze said results to identify at least one of said hosts which has a potential cybersecurity issue; and
        facilitate taking at least one remedial action with respect to said identified one of said hosts.

15. The apparatus of claim 14, wherein estimating said parameters of said restricted hidden Markov model (HMM) comprises:
    computing three feature vectors at a given one of said timestamps, one vector for said time-invariant characteristics, one vector for said first time-varying characteristics, and one vector for said second time-varying characteristics;
learning sequences of temporal states, and
learning parameters of a generative model within each state and transition probability function using said time-invariant characteristics, said first time-varying characteristics, and said second time-varying characteristics.

16. The apparatus of claim 15, wherein estimating said parameters comprises employing a Markov chain Monte Carlo technique.

17. The apparatus of claim 15, wherein estimating said parameters comprises employing Variational Inference (VI).

18. The apparatus of claim 14, wherein estimating said parameters comprises employing Laplace Approximation.

19. The apparatus of claim 14, wherein said at least one remedial action comprises blocking network traffic from said identified one of said plurality of hosts.

20. The apparatus of claim 14, wherein said at least one remedial action comprises monitoring network traffic from said identified one of said plurality of hosts.

21. The apparatus of claim 20, wherein said at least one remedial action further comprises blocking network traffic from said identified one of said plurality of hosts, responsive to said monitoring.

22. The apparatus of claim 14, wherein said at least one remedial action comprises scanning said identified one of said plurality of hosts for malware and at least one of removing and quarantining discovered malware thereon.

23. The apparatus of claim 14, wherein said analyzing of said results to identify at least one of said hosts which has a potential cybersecurity issue comprises clustering said hosts into a plurality of clusters and comparing said results for each of said hosts to other hosts in a same one of said plurality of clusters.

24. A method comprising:
 observing, for a plurality of online actors acting on a computer network, at a plurality of timestamps:
  first time-varying characteristics comprising at least one of web browsing activity and web search activity;
  second time-varying characteristics comprising at least one of income, social connections, interests, and seasonal access patterns; and
  time-invariant characteristics comprising at least one of residence and demographic information;
  wherein said second time varying characteristics vary on a time scale between said time-invariant characteristics and said first time-varying characteristics;
 constructing a restricted hidden Markov model (HMM) wherein:
  said first time-varying characteristics comprise observed variables of said model;
  said model is configured to predict actual actor states for said plurality of actors, said actual actor states comprising hidden variables of said model, wherein said observed variables, at a current one of said timestamps, depend on current values of said hidden variables and prior timestamp distribution of said observed variables, said current values of said hidden variables in turn depending on prior timestamp values of said hidden variables as well said time-invariant characteristics of said actors and current timestamp values of said second time-varying characteristics of said actors;
 estimating parameters of said restricted hidden Markov model (HMM);
 running said restricted hidden Markov model (HMM) with said estimated parameters for each of said plurality of actors to obtain results;
 analyzing said results to identify at least one of said actors which has a potential cybersecurity issue; and
 taking at least one remedial action with respect to said identified one of said actors.

25. A non-transitory computer readable medium comprising computer executable instructions which when executed by a computer cause the computer to perform a method of:
 observing, for a plurality of online actors acting on a computer network, at a plurality of timestamps:
  first time-varying characteristics comprising at least one of web browsing activity and web search activity;
  second time-varying characteristics comprising at least one of income, social connections, interests, and seasonal access patterns; and
  time-invariant characteristics comprising at least one of residence and demographic information;
  wherein said second time varying characteristics vary on a time scale between said time-invariant characteristics and said first time-varying characteristics;
 constructing a restricted hidden Markov model (HMM) wherein:
  said first time-varying characteristics comprise observed variables of said model;
  said model is configured to predict actual actor states for said plurality of actors, said actual actor states comprising hidden variables of said model, wherein said observed variables, at a current one of said timestamps, depend on current values of said hidden variables and prior timestamp distribution of said observed variables, said current values of said hidden variables in turn depending on prior timestamp values of said hidden variables as well said time-invariant characteristics of said actors and current timestamp values of said second time-varying characteristics of said actors;
 estimating parameters of said restricted hidden Markov model (HMM);
 running said restricted hidden Markov model (HMM) with said estimated parameters for each of said plurality of actors to obtain results;
 analyzing said results to identify at least one of said actors which has a potential cybersecurity issue; and
 facilitating taking at least one remedial action with respect to said identified one of said actors.

* * * * *